United States Patent
Chiang et al.

(10) Patent No.: US 9,100,653 B2
(45) Date of Patent: *Aug. 4, 2015

(54) MEMORY TRANSFER CONTROLLER AND METHOD OF TRANSFER CONTROL OF VIDEO LINE DATA AND MACROBLOCK DATA

(75) Inventors: Patricia Wei Yin Chiang, Singapore (SG); Lucas Y. W. Hui, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 1785 days.

This patent is subject to a terminal disclaimer.

(21) Appl. No.: 11/461,611

(22) Filed: Aug. 1, 2006

(65) Prior Publication Data

US 2007/0121730 A1   May 31, 2007

Related U.S. Application Data

(62) Division of application No. 10/356,719, filed on Jan. 30, 2003, now Pat. No. 7,126,992.

(30) Foreign Application Priority Data

Jan. 30, 2002   (SG) ............................. 200200600-5

(51) Int. Cl.
| | | |
|---|---|---|
| H04N 7/12 | (2006.01) | |
| H04N 19/423 | (2014.01) | |
| H04N 19/61 | (2014.01) | |

(52) U.S. Cl.
CPC ............. *H04N 19/423* (2014.11); *H04N 19/61* (2014.11)

(58) Field of Classification Search
CPC ...................................................... H04N 19/433
USPC .............. 375/240.01, 240.24, 240.27, 240.28
IPC ........................................................ H04N 7/12
See application file for complete search history.

(56) References Cited

U.S. PATENT DOCUMENTS

| | | |
|---|---|---|
| 5,581,310 A | 12/1996 | Vinekar et al. |
| 5,892,522 A | 4/1999 | Moutin |
| 6,028,612 A | 2/2000 | Balakrishnan et al. |

*Primary Examiner* — Young Lee
(74) *Attorney, Agent, or Firm* — Seed IP Law Group PLLC (57) ABSTRACT

A method of transferring sets of video line data and macroblock data, includes the steps of determining a macroblock period and a video line period longer than the macroblock period, dividing each set of video line data to be transferred within the video line period into two or more portions according to the difference between the determined macroblock period and video line period, aligning a burst transfer of each of the portions of the divided set of video line data and each set of macroblock data to the macroblock period, and initiating the burst transfer of the sets of video line data and macroblock data at macroblock period intervals.

18 Claims, 8 Drawing Sheets

RG=Request Generation in System Processor; RS=Request Service in Memory Transfer Controller

MEMORY TRANSFER CONTROLLER AND METHOD OF TRANSFER CONTROL OF VIDEO LINE DATA AND MACROBLOCK DATA

CROSS REFERENCE TO RELATED APPLICATION

The present application is a divisional of U.S. patent application Ser. No. 10/356,719, entitled "MEMORY TRANSFER CONTROLLER AND METHOD OF TRANSFER CONTROL OF VIDEO LINE DATA AND MACROBLOCK DATA," filed Jan. 30, 2003, assigned to the same assignee as the present application, and incorporated herein by reference in its entirety.

BACKGROUND OF THE INVENTION

1. Field of the Invention

The present disclosure relates to a memory transfer controller and method of transfer control for video line data and macroblock data. The memory transfer controller can be a bridge between a video system and a standard bus system for access to an external memory.

2. Description of the Related Art

The prior art has generally focused on the organization of data in memory and the use of controller circuits to facilitate the efficient transfer of video data between a video system and external memory.

U.S. Pat. No. 5,581,310 by Vinekar et al., entitled "Architecture for a High Definition Video Frame Memory and an Accompanying Data Organization for Use Therewith and Efficient Access Therefrom" describes an architecture for a memory with a wide word width particularly suited for use as a high definition video frame store memory and an accompanying organization for storing pixel data therein to facilitate efficient block and raster access therefrom. Specifically, the memory relies on storing n-byte words (n=m1×m2) across m2 independent memory segments with pre-defined positional offsets between m1-byte words stored in successive memory segments. All these segments are simultaneously accessed on a read or write basis. This structure of storage allows two widely differing forms of memory access, part of raster line or sub-block of macroblock, to be accessed easily using appropriate pipeline shuffling circuitry.

U.S. Pat. No. 5,892,522 by Moutin, entitled "Method and Apparatus for Addressing a Memory Area of MPEG Decoder", describes a method and apparatus for addressing a memory area assigned to bi-directional images from a decoder according to an MPEG standard and organized in rows of macroblocks constituted by blocks containing data relative to a group of pixels of the image. The method, by dividing each data block into a half block of odd lines and a half block of even lines and then sequentially arranging all half-blocks of the same type in the same row of macroblocks, enables the reduction of memory area for storing bi-directional images.

U.S. Pat. No. 6,028,612 by Balakrishnan et al., "Picture Memory Mapping to Minimize Memory Bandwidth In Compression and De-compression of Data Sequences", describes a method of partitioning the picture into 2 or more stripes, each having a pre-determined number of columns and sequentially mapping each row of the stripes to a subsequent word in memory that can reduce bandwidth when retrieving an array portion of the picture from memory. This was extended for the case of interlaced video sequences where a frame picture can be stored in a field organized memory with similar mapping schemes.

In a typical video encoding and decoding system, large amounts of video data are required to be transferred over a shared system bus, which may support other peripheral devices, especially for video encoding systems like MPEG-2, which eliminate temporal redundancy by motion estimation and inter-picture coding.

Optimal memory bandwidth usage is important for implementation. Some conventional methods that minimize bandwidth usage limit the data processing required to be performed, for example by implementing a smaller motion estimation search window or reducing or eliminating video pre- or post processing. Often, these methods achieve a lower bandwidth at the expense of encoded picture quality.

On the other hand, a faster and wider memory access can be developed to increase bandwidth to maintain picture quality. This can, however, increase power consumption and implementation complexity.

The problem of bandwidth usage can be described more specifically in relation to an MPEG compression system that consists of a video pre-processing sub-system that processes data at the video line rate and a video encoder sub-system that processes data at the macroblock rate. This represents two independent periodic data transfer events on the system bus.

The difference between video line data rate and macroblock data rate on the system bus gives rise to a situation, where both types of data transfers occur simultaneously, known as peak memory access bandwidth. This may cause unacceptable latency in data transfer which may crash the video pre-processor sub-system that is receiving digital data input in real time and may cripple the real time processing of the video encoder sub-system.

The worst case memory access bandwidth may be further aggravated where additional bus load is caused by other peripheral devices and or external memory access on the same system bus on top of the peak memory access bandwidth of the two sub-systems. This additional bus load may be unpredictable and difficult to control.

Solutions such as higher memory access and system bus throughput and/or using a larger memory buffer or usage of cache can improve efficiency but have the drawback of increasing implementation costs significantly.

During normal operation, the frequency of macroblock data transfer is higher than that of video line transfer. The video pre-processor sub-system requires video line data transfer at least every 64:s and 63.6:s for a PAL and NTSC system respectively. The video encoder sub-system requires macroblock data transfer at least every 24.7:s for a D1 picture.

On the other hand, the video line transfer has a larger amount of data transfer than the macroblock data transfer. For example, a luminance image video line transfer comprises of 720 bytes while the luminance image macroblock transfer comprises of 256 bytes.

BRIEF SUMMARY OF THE INVENTION

An embodiment of the present invention provides a method of transferring sets of video line data and macroblock data, comprising:

determining a macroblock period and a video line period longer than the macroblock period;

dividing each set of video line data to be transferred within the video line period into two or more portions according to the difference between the determined macroblock period and video line period;

aligning a burst transfer of each of the portions of the divided set of video line data and each set of macroblock data to the macroblock period; and initiating the burst transfer of the sets of video line data and macroblock data at macroblock period intervals.

An embodiment of the present invention also provides a memory transfer controller having means for executing the method as described above.

An embodiment of the present invention also provides a memory transfer controller for controlling the transfer of macroblock data to or from a video encoder and the transfer of video line data to or from a video pre-processor, wherein the size of a unit of the video line data is larger than the size of a unit of the macroblock data and the transfer of the macroblock data is effected in a first predetermined time period, wherein the memory transfer controller is adapted to divide the video line data into two or more portions for transfer of each of said portions in respective ones of said first predetermined time period.

An embodiment of the present invention also provides a video compression system comprising a memory transfer controller as described above.

An embodiment of the present invention also provides a video decompression system comprising a memory transfer controller as described above, except that the video encoder is instead a video decoder and the video pre-processor is instead a video post-processor.

In general terms, embodiments of the invention split the set of larger and lower frequency video line data transfer into two or more smaller data transfers at the higher frequency macroblock timing level. In this way, the video line data transfer rate is aligned with the macroblock transfer rate and the correlation in data transfers between the video pre-processor and video encoder sub-systems reduces the peak memory access bandwidth usage.

In addition, video line data transfers at macroblock timing level allows for a finer priority differentiation within the set of video line data transfers and the flexibility of higher priority assignment over macroblock data transfers at macroblock timing level since the video pre-processor sub-system has a real time input of video data.

By splitting and aligning the video line data transfer to the period macroblock data transfer and assigning priority to video line data, the embodiment invention can schedule burst transfers to maximize memory throughput and thus increase system performance while controlling implementation cost.

Furthermore, embodiments of the present invention reduce the impact of the worst case bandwidth by differentiating and fine-tuning the real time requirements of the two sub-systems. The video pre-processor sub-system has a hard deadline for the video line data that is driven by a fixed real time input format of video data, whereas the video encoder sub-system can be designed to accommodate a soft deadline for the macroblock data since the real time constraint can be applied at the picture level.

By taking into consideration the impact of memory overheads and additional bus loads, a macroblock processing period that is smaller than real time limit of 24.7:s and a system bus that is operating efficiently but not at full capacity can be designed.

In the event of the worst case bandwidth situation occurring, the deadline for the set of macroblock data transfers, and hence the processing time for the video encoder sub-system, can be extended for one macroblock period while the real time constraint for the video encoder sub-system is still met. Further prioritization for the video line data to be transferred at the extended macroblock timing can be introduced to meet the hard deadline of the video pre-processor sub-system.

By scheduling both types of data transfers in this prioritized manner and handling the worst case bandwidth situation gracefully for the video encoder sub-system, embodiments of the invention increase the overall reliability of the video compression system without compromising implementation cost and picture quality.

One embodiment of the invention can be applied to a generic video compression system with a video encoder sub-system and a video pre-processor sub-system or a generic video de-compression system with a video decoder sub-system and a video post-processor sub-system that is linked to the external memory via a standard shared system bus, to which other peripheral devices may be attached.

The encoder and decoder sub-systems process data in macroblock format according to an MPEG standard and organized in rows of macroblocks constituted by blocks containing data relative to a group of pixels for the entire picture running at a real time rate of 25 or 30 frames per second for PAL and NTSC system and require frequent macroblock data accesses to external memory.

The pre-processing and post-processing sub-systems, on the other hand, process data in video line or raster format according to the ITU-R BT.601/656 standard and organized in sequential lines of pixels in an image constituted of two fields and require video line data accesses to external memory within a specified line interval.

Embodiments of the invention provide a method and apparatus to transfer these video line data and macroblock data efficiently between the video system and external memory according to the differing rate, format and size transfer requirements of the individual sub-system.

At the system level, a macroblock period and a video line period is first determined. The former relates to the nominal timing interval within which the encoder or decoder sub-system processes one unit of macroblock-data. The latter refers to the specific line timing constraint within which the pre-processing or post-processing processes one line of video data.

Each set of video line data to be transferred in the video line period is divided according to the number of macroblock periods which fit within the video line period. The set of macroblock data transfers within the macroblock period and divided video line data transfers are then aligned with differing priorities at the macroblock period interval and subsequently transferred in burst mode on the system bus.

The occurrence of the worst case bandwidth situation, usually caused by discrete and higher priority data transfer of peripherals on the system bus, increases the response time interval of the data transfers of the sub-systems. In the event that the set of macroblock data transfers is not completed within one macroblock period, the processing time of the current macroblock is extended by one macroblock period, hence delaying the onset of the next set of transfer of macroblock data.

In event that the set of divided video line data transfer is not completed within one macroblock period but within the video line period, the next set of macroblock data or divided video line data transfer is delayed until the transfer of the current set of divided video line data is completed. In event that the video line data transfer is not completed within one video line period, a soft recovery method is employed to localize transfer error.

DETAILED DESCRIPTION

Embodiments of a memory transfer controller and method of transfer control of video line data and macroblock data are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
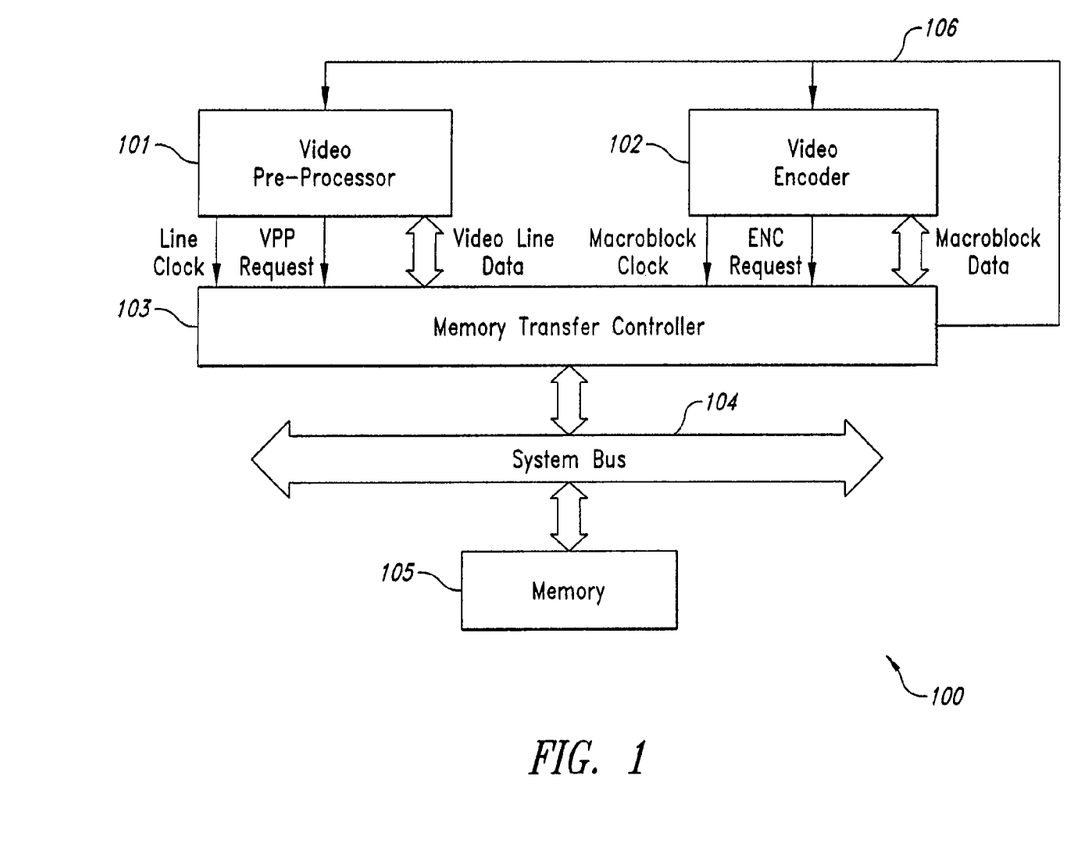
FIG. 1 illustrates a general structure of an embodiment of a video compression system.

An embodiment of the invention is described in relation to FIG. 1, which shows a MPEG-2 video compression system 100, including a video pre-processor sub-system 101 and video encoder subsystem 102. The video pre-processor sub-system 101 makes a set of video line data transfer requests in each line period while the video encoder sub-system 102 makes a set of macroblock line transfer requests in each macroblock period.

The data requests of the two sub-systems 101, 102 are handled by a dedicated hardware block, referred to as memory transfer controller 103, that receives data requests from the sub-systems 101, 102, prioritizes them, initiates bus protocols and schedules data transfers to the memory 105 via a shared system bus 104. The status of each transfer request may then be fed back to the sub-systems 101, 102 through path 106, for example via a peripheral bus.

Figure 2:
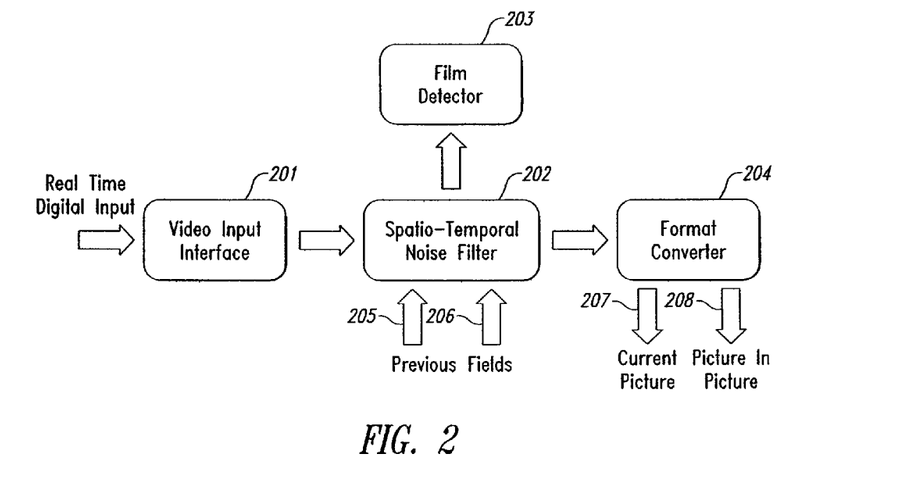
FIG. 2 illustrates the I/O transfers of a video pre-processor sub-system in accordance with an embodiment of the invention.

An example embodiment of the video pre-processor sub-system 101 is shown in FIG. 2. A video input interface 201 extracts video data and synchronization signals from a real time digital input. A spatio-temporal noise filter 202 reduces spatial and temporal noise on the video image. A film detector 203 performs inverse 3:2 pulldown and a format converter 204 filters and decimates the original video to a desired format for encoding.

When a video pre-processor sub-system 101 is processing a field n, an example set of possible data transfers includes luminance and chrominance video line data of the previous field n-1 205 and n-2 206 for noise reduction and inverse 3:2 detection, chroma-sampled and noise-filtered luminance and chrominance video line data output 207 of a main picture and chroma-sampled and noise-filtered luminance and chrominance video line data output 208 of a "picture in picture" application (for example, where a small picture is laid on top of the main picture, which is a full screen picture running at the refresh video rate).

Figure 3:
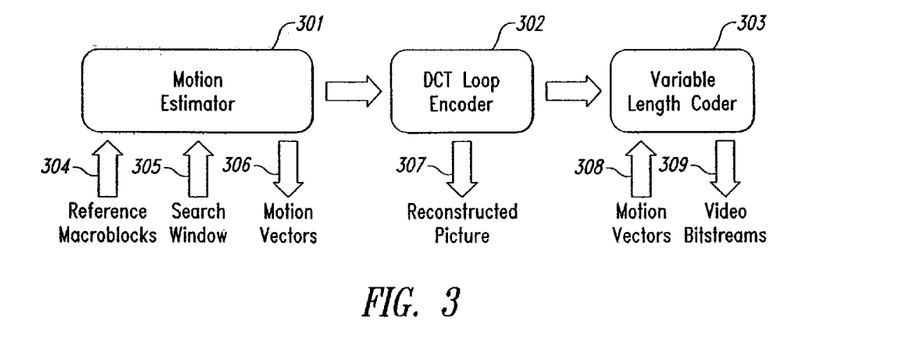
FIG. 3 illustrates the I/O transfers of a video encoder sub-system in accordance with an embodiment of the invention.

An example embodiment of the video encoder sub-system 102 is shown in FIG. 3. The video encoder subsystem 102 includes a motion estimator 301 that searches for motion vectors and generates prediction data from the searched motion vectors, a DCT loop encoder 302 that performs discrete cosine transformation, quantization, and motion compensation on the video data and reconstructs the video data that appears on the decoder, and a variable length coder 303 that performs zigzag scan, run length and huffman encoding to form MPEG-2 bitstreams.

For the video encoder sub-system 102, the possible data transfers include the loading of the reference luminance and chrominance macroblock data 304 into the motion estimator for coding and prediction data generation, the updating of the search window 305 for the motion vector search and the storing of computed motion vectors 306. The reconstructed luminance and chrominance macroblock data 307 is output from the DCT loop encoder 302 for motion compensation and the motion vectors 308 are input to the variable length coder 303 for variable length coding outputs of the encoded MPEG-2 bitstreams 309.

The video line transfers occur at a line frequency determined by the real time constraint of the input video format. As an example, a PAL system has a line period of 1/(625 lines per frame*25 frames per second)=64:s while an NTSC system has a line period of 1/(525 lines per frame*30 frames per second)=63.5:s.

As an embodiment, the macroblock data transfers can occur at a macroblock frequency that is designed to satisfy the maximum processing period of macroblock data for each component in the video encoder sub-system 102, the period required for maximum sum of all I/O transfers that may occur in processing a macroblock and the software processing overhead time incurred for each macroblock.

The chosen macroblock period is under the real time constraint of 1/(1350 macroblocks per NTSC frame*30 frames per second) or 1/(1620 macroblocks per PAL frame*25 frames per second)=24.7:s in an embodiment. Excess macroblock periods other than 1620 per PAL frame or 1350 per NTSC frame are also be considered in order to be able to respond to additional bus loads and frame and or slice processing.

The data transfers occur at different rates and size on the system bus 104 that has a maximum bandwidth capacity defined as the multiple of the width and clock frequency of the bus. Ideally, the system bus 104 should be designed to operate efficiently at 100% capacity but there are overheads in bus hand-shaking protocols. The lower operating frequency of the memory and memory operation overheads like row activation in double data rate synchronous dynamic random access memory (DDR-SDRAM) results in a lower memory access bandwidth capacity than system bus 104 bandwidth capacity.

Due to the changing bus load conditions, an average memory access bandwidth that guarantees relatively constant bus loads in a time period can be defined as an alternative target. The peak memory access bandwidth, defined as the maximum memory access bandwidth at any point in time, should be below the capacity of the system bus.

By dividing each set of video line data to be transferred within the video line period according to multiples of the macroblock period within the video line period, the peak memory access bandwidth can be reduced and then an average memory access bandwidth is achieved.

For a line period of 64:s and a macroblock period of 23.1:s, there are at least two and sometimes three macroblock clock edges between two line clock edges. As an example embodiment, the set of video line data transfers can be divided into two sub-sets: one comprising of input video line data of field n−1, output luminance video line data of main picture and picture in picture; and the other comprising of the input video line data of field n−2, output chrominance video line data of main picture and picture in picture.

For each entity of data transfer, there is an associated latency between the time when the request is first activated on the system bus and when the first response packet is received, depending on the architecture of the bus node (e.g., the number of arbiters and size of buffers, number of peripherals on the shared bus, number, size and pre-emption of requests granted currently and priority, size and grouping of data requests).

The entity of data transfer can be implemented as a series of short transfers driven by fullness of buffers at the bus interface or as one long transfer at a pre-determined time coupled with double buffering at the bus interface. The latter, known as burst mode transfer, is used in the present invention to reduce the overhead memory operations in for example DDR-SDRAM and thus utilize the memory access bandwidth more efficiently.

By aligning the burst transfers of a divided set of video line data transfers and an original set of the macroblock data to the macroblock period, the two subsets of the video line data can be aligned to the first and second macroblock periods encountered in the line period, and prioritization of each entity of data transfer relative to the set of data transfers within the macroblock period can be done. The sequence of data transfers within each set can be fine-tuned for more graceful degradation measures. Degradation here refers to the processing of erroneous data by the video pre-processor arising when the video line I/O transfers are not completed within a line period. Some measures to minimize the impact of erroneous data can include software programming of the transfer controller in order to effect more quality-critical I/O transfers prior to less quality-critical I/O transfers.

Burst transfers of the divided set of video line data are processed before the set of macroblock data as the video pre-processor sub-system 101 has a tighter real time constraint of line period whereas the video encoder sub-system 102 is designed to have spare macroblock periods. For higher differentiation of priorities, the set of video line data transfers can be given higher priority than other data requests on the system bus 104 including the macroblock data from the video encoder sub-system 102.

The burst transfer of two sets of data transfers are initiated at the start of each macroblock period consecutively, increasing the maximal response time of data transfers and thus reducing the possibility of the data transfer not being completed before it is required by the peripherals.

In the event that the macroblock data transfers are not completed before the start of the next macroblock cycle where they are processed, the video encoder sub-system 102 holds the processing of the next macroblock data for one macroblock period and the memory transfer controller 103 delays the onset of the next set of macroblock transfers so that there is an additional macroblock cycle time to complete the current macroblock data transfers.

By designing spare macroblock cycles in the video encoder sub-system 102, the occasional higher system bus traffic or worst case bandwidth can be handled without the need for any degradation mechanisms in the video encoder sub-system 102 or faster or wider memory access, thus increasing the robustness of the video compression system 100 at little implementation cost.

A more graceful degradation mechanism is included as a separate embodiment for the video line data transfers that have a more critical real time constraint. The n divided subsets of a set of video line transfers can be classified into the first n-1 subsets and the nth subset for handling of the worst case bandwidth. The former has to complete the data transfers within one macroblock period while the latter has to complete the data transfers before the start of the next line period.

In the event that the former does not meet the macroblock period constraint, the next subset of video line data transfers (instead of the current macroblock data transfers) is initiated immediately after the current subset of video line transfers completes. In this case, the current macroblock data transfers are delayed until the next subset of video line transfers completes and the video encoder sub-system 102 is on hold as described previously. The priority inversion of current macroblock data transfer and the subset of video line data transfer is done in view of the more critical time constraint of the pre-processor subsystem 101.

In event that the latter does not meet the line period constraint, the memory transfer controller 103 ignores the incoming video line data, terminates any outstanding requests of the current sub-set to the memory and enters a waiting state until all granted requests have been handled before resuming normal operation. The double buffering of the bus interface of peripherals for burst transfer mode localizes the outstanding data transfers to the current line period. This degradation is transparent to the preprocessor sub-system 101 as operations continue as normal (except if worse case bandwidth is prolonged).

Reference is made hereinafter to FIGS. 4 to 10.

Figure 4:
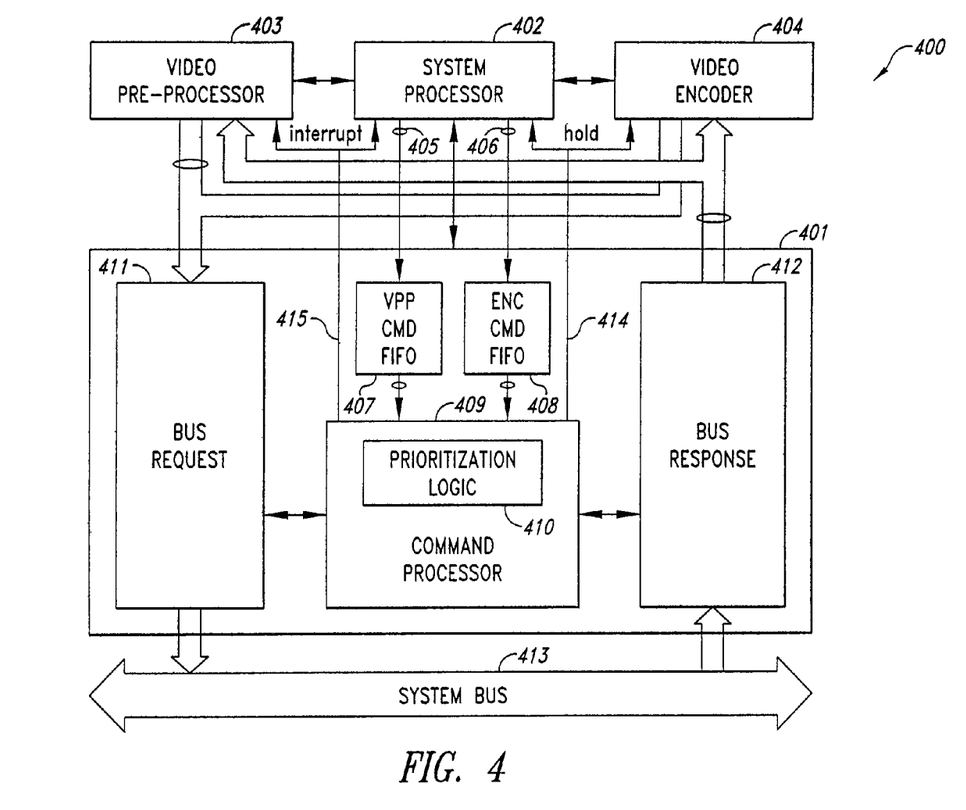
FIG. 4 illustrates an architecture of an embodiment of a memory transfer controller.

In a further embodiment, the invention may be implemented using a video compression system 400 having a memory transfer controller 401 as illustrated in FIG. 4. In this particular embodiment, the video compression system has an overall system processor 402 that controls the operation of the video pre-processor sub-system 403, the video encoder sub-system 404 and the memory transfer controller 401 and is responsible for generating data transfer requests.

Double buffering of macroblock data is done at the interface between the video encoder subsystem 404 and the memory transfer controller 401 while double buffering of video line data is done at the interface between the video preprocessor subsystem 403 and the memory transfer controller 401 to facilitate the burst transfers of the macroblock data and video line data. The double buffer accumulates the output macroblock data and video line data for transfer to memory in the next macroblock period and various macroblock periods of the next line, respectively. Similarly, the double buffer collects the input macroblock data and video line data from memory for the video encoder subsystem 404 processing in the next macroblock period and the video pre-processor subsystem 403 in the next line period.

The data transfers for both sub-systems 403, 404 can be made programmable by the system processor in the form of DMA command registers, downloaded via path 406 for macroblock data transfers to an encoder command FIFO buffer 408 and path 405 for video line data transfers to a pre-processor command FIFO buffer 407, whereby the memory transfer controller hardware schedules individual data transfers according to the method described above. The software flexibility of this scheme allows for fine prioritization by sequential ordering within the set of data transfers.

Figure 5:
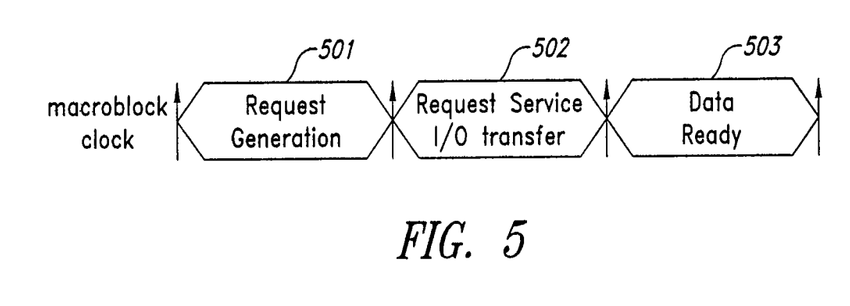
FIG. 5 is a timing diagram for a set of macroblock data transfers in accordance with an embodiment of the invention.

The macroblock data transfers are processed with respect to the macroblock clock as shown in FIG. 5. In an example macroblock period 501, the system processor 402 generates the macroblock data requests of all sub-blocks for a macroblock processing in the video encoder sub-system 404, organizes the I/O information in registers and sends them to memory transfer controller 401 via path 406 for storage in the encoder command FIFO buffer 408. In the next macroblock period 502, the memory transfer controller 401 reads from the FIFO buffer 408 and services the data transfers sequentially according to their priority so that data is ready in the video encoder sub-system 404 before the start of the one after the next macroblock period 503 for further processing.

Figure 6:
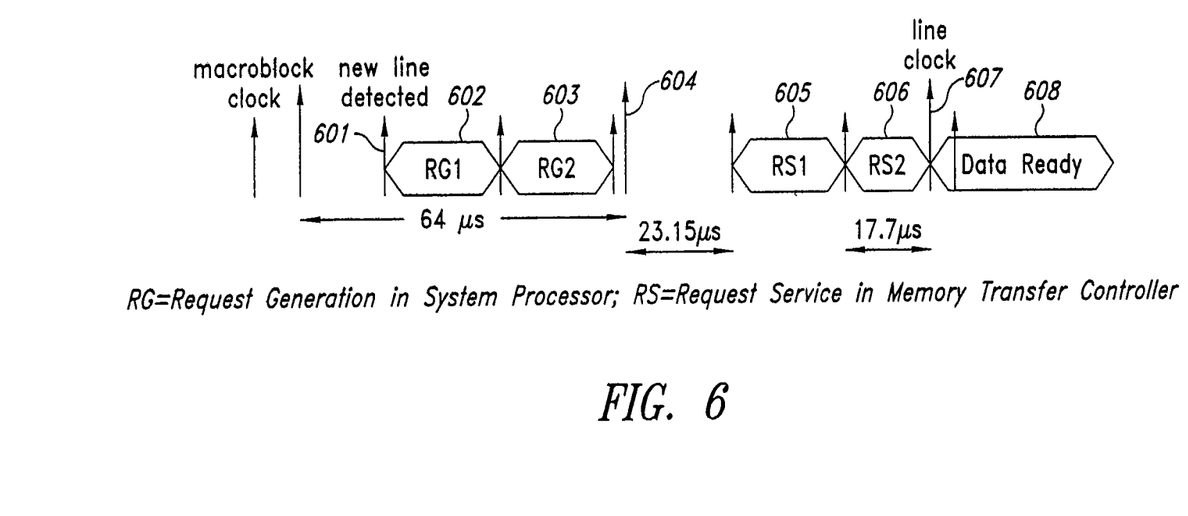
FIG. 6 is a timing diagram for a set of video line data transfers in accordance with an embodiment of the invention.

The video line data transfers, on the other hand, are processed with respect to both the macroblock clock and line clock, as shown in FIG. 6. For an example line period of 64:s and macroblock period of 23.1:s, the set of video line transfers is processed in two macroblock periods. The system processor 402 checks a new line indication flag given by the memory transfer controller 401. If a new line 601 is detected at the start of the macroblock period, the software of the system processor 402 has the flexibility to generate half of the VPP requests for the line in the current macroblock period 602 and the other half in the next macroblock period 603. The detection of the new line is at 601, which is the start of the first macroblock period 602 after the line clock trigger.

Similarly, the memory transfer controller 401 determines the first two macroblock periods 605, 606 of the next new line 604 to service half the video line data transfers for the current line in each macroblock period so that the data 608 is ready in the video pre-processor sub-system 403 before the start of the next line period 607 for further processing. The advantages of the scheme are to minimize peak bandwidth usage of system bus and to simplify the design of memory transfer controller and simplify the scheduling of processes in the system processor.

Figure 7:
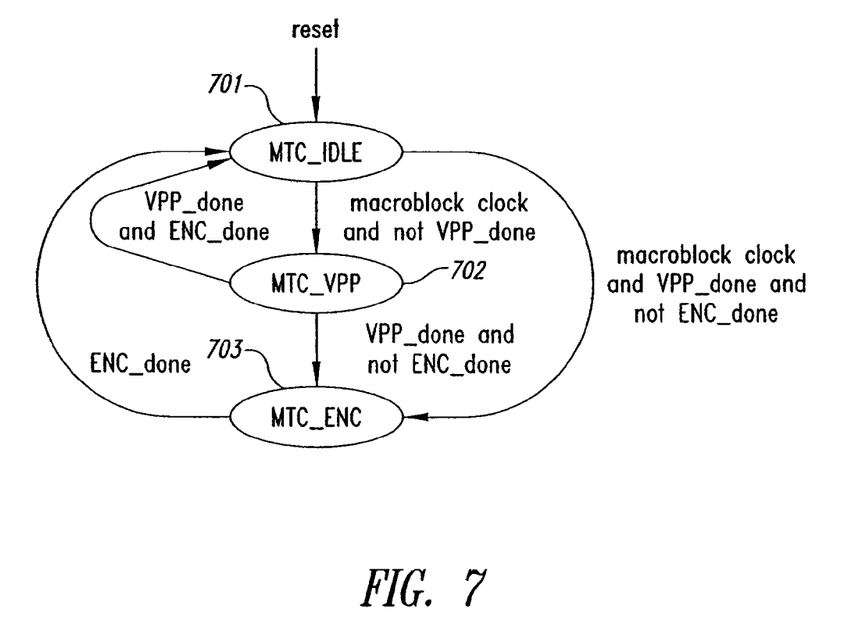
FIG. 7 shows an embodiment of a general state machine for operation of the memory transfer controller.

When triggered by the macroblock clock, the memory transfer controller 401 reads the command entries from the two command FIFOs 407 and 408 through a prioritization logic circuitry 410 (the function of which is described by the state machine of FIG. 7). The memory transfer controller 401 is normally reset to MTC_IDLE state 701. On detecting a macroblock clock signal, the memory transfer controller 401 moves to MTC_VPP state 702 to process video line data requests if a VPP_done signal is low or there are video line data transfers for the current macroblock period in the pre-processor command FIFO buffer 407.

After the completion of burst transfer of all video line data and if ENC_done is low or there are macroblock data transfers for the current macroblock period in the encoder command FIFO buffer 408, memory transfer controller 401 moves to a MTC_ENC state 703 to process macroblock data requests, else if ENC_done is high or there are no macroblock data transfers, the memory transfer controller resets back to MTC_IDLE 701.

Otherwise on detecting a macroblock clock in MTC_IDLE state, if VPP_done is high or there are no video line transfers and ENC_done is low or there are macroblock data transfers for the current macroblock period in the encoder command FIFO buffer 408, the memory transfer controller moves to MTC_ENC state 703 to process video line data requests and moves back to MTC_IDLE on completion.

A command processor 409 co-ordinates the operation of the memory transfer controller 401, interprets the command entries from the FIFO buffers 407, 408, initiates the burst transfers of the macroblock and line data transfers and provides feedback response on the operation status of the system processor 402, video pre-processor sub-system 403 and video encoder sub-system 404.

The memory transfer controller 401 employs a centralized data transfer scheme. A bus request module 411 handles the bus request protocols and interfaces with the peripheral devices to download data to system bus 413 for a STORE operation. A prioritization field may also be set for individual data transfers to facilitate an arbitration scheme for the system bus 413. On the other hand, a bus response module 412 receives the response packets from the system bus and interfaces with the peripheral devices to upload data for LOAD operations.

Figure 8:
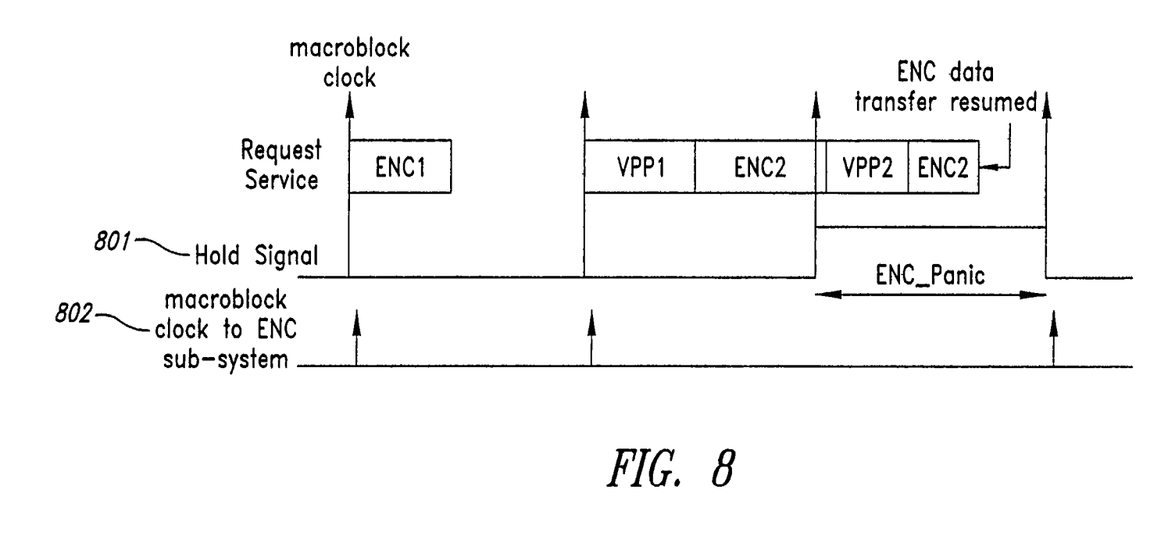
FIG. 8 is a timing diagram of a ENC_PANIC situation in accordance with an embodiment of the invention.

The situation when the macroblock data transfers are not completed before the start of the next macroblock cycle where they are processed is defined as ENC_PANIC, as illustrated in FIG. 8. In the example illustration of FIG. 8, macroblock data transfers ENC1 are serviced in the first macroblock period. More macroblock data transfers ENC2 and a first subset of video line data transfers VPP1 are serviced in the second macroblock period. A second subset of video line data VPP2 is serviced in the third macroblock period.

Figure 9:
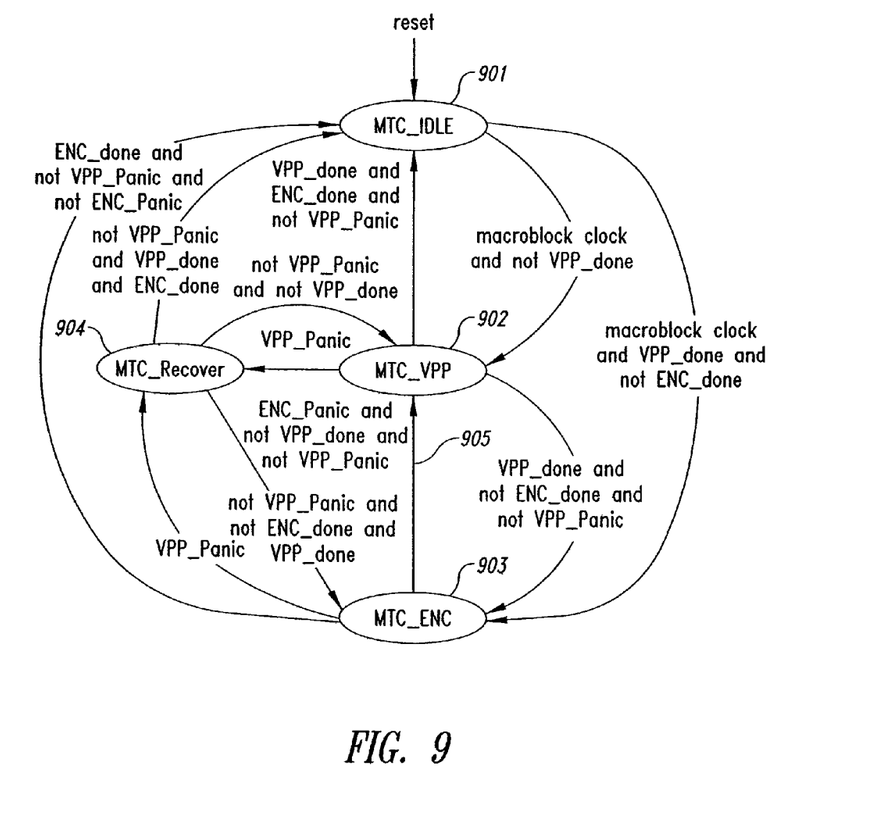
FIG. 9 shows an embodiment of a general state machine for operation of memory transfer controller equipped with worst case bandwidth handling.

The state diagram in FIG. 9 illustrates the operation of the memory transfer controller 401. On software reset, the memory transfer controller 401 enters a MTC_IDLE state 901 and waits for events to trigger its operation. In response to a first macroblock clock trigger (e.g., as shown in FIG. 8) the memory transfer controller 401 enters a MTC_ENC state 903 where ENC1 is serviced immediately in the first macroblock period as there are no VPP requests to be serviced. After completion of the I/O transfer, the memory transfer controller 401 transits back to the MTC_IDLE state 901.

In response to the second macroblock clock trigger (in FIG. 8), memory transfer controller 401 transits from the MTC_IDLE state 901 to a MTC_VPP state 902 where VPP1 is serviced first in the second macroblock period (as it has higher priority than macroblock data transfer requests), after which it transits to the MTC_ENC state 903 where ENC2 is serviced in the same macroblock period. In this case ENC2 did not complete within the same macroblock period and this gives rise to the ENC_PANIC situation.

On detecting ENC_PANIC, the memory transfer controller 401 transits back to the MTC_VPP state 902 immediately and gives priority 905 to the processing of video line data transfers VPP2 aligned to the next macroblock period, stalling current macroblock data transfers temporarily.

In addition, the memory transfer controller 401 raises the hold signal 801 and outputs the same hold signal 414 to the system processor 402 and video encoder sub-system 404 that can be used to disable generation of macroblock data transfer requests in the system processor 402 and or can be used to mask out the macroblock clock to the video encoder sub-system 404 (as indicated by the masked macroblock clock signal at 802) such that the current macroblock processing is extended automatically by one macroblock period.

Figure 10:
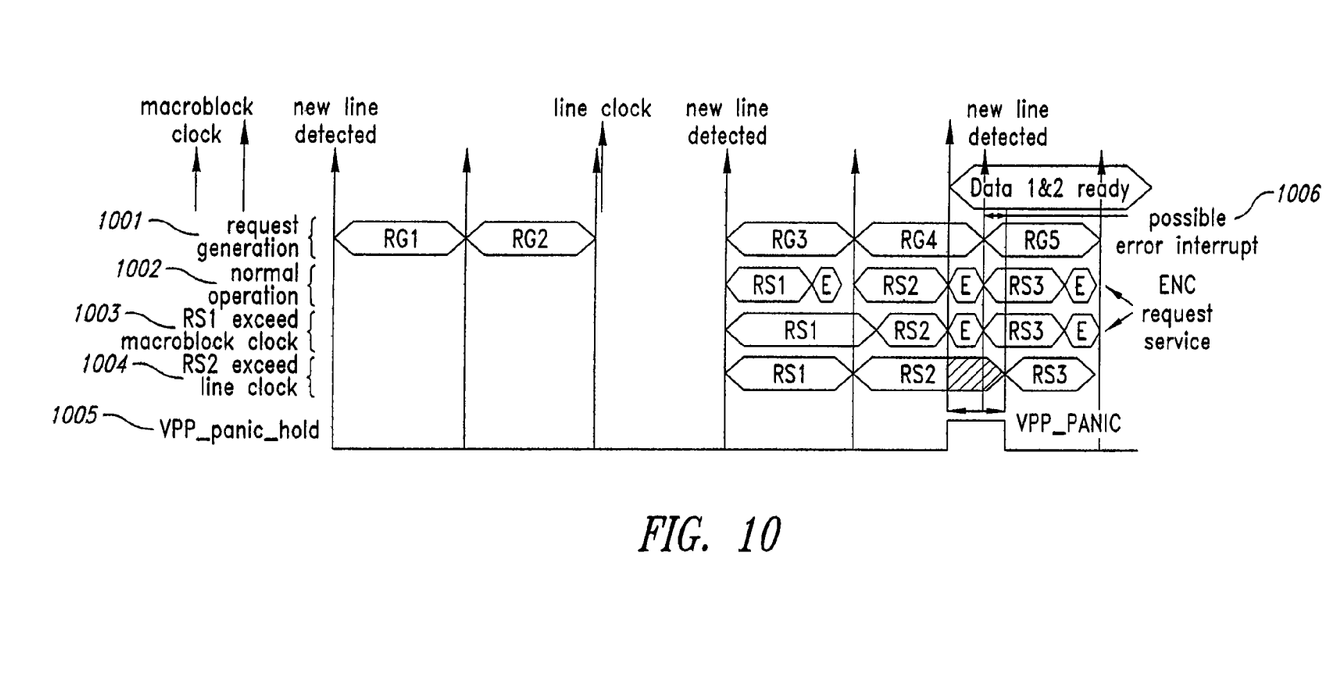
FIG. 10 is a timing diagram illustrating an embodiment of a degradation handling method for video line data transfers including a VPP_PANIC situation.

A degradation handling method for the video line data transfer is shown in FIG. 10. In this example, there are five video line transfer request grants RG1 to RG5 in the respective time periods as shown by example 1001. During normal operation (example 1002), the video line data request services RS1 to RS3 are completed before the macroblock data request services (denoted by E).

However, if the first n-1 divided subsets of video line transfers (in this example, the request service 1, or RS1) are not completed before the start of the next macroblock period, the memory transfer controller 401 continues RS 1 and gives priority to request service 2 (RS2) over the current outstanding set of macroblock data transfers service E, as illustrated by example 1003.

On the other hand, if the nth divided subset of video line transfers (in this example RS2) is not completed before the start of the next line period, the VPP_PANIC situation is defined (as illustrated by example 1004) and the memory transfer controller 401 transits from the MTC_VPP state 902 to a MTC_RECOVER state 904, where it completes the current bus request. The memory transfer controller 401 flushes the remaining video line data transfer requests for the current line in the FIFO buffers and does not upload the received previous line data to the video pre-processor sub-system 403. Additionally, the VPP_panic_hold signal 1005 is raised. Normal operation only resumes when all pending system bus transactions are received and the memory transfer controller 401 then makes a transition back to the MTC_VPP state 902 for processing the video line data request service RS3. The scheme has the added advantage that it is transparent to the system processor 402 and video pre-processor sub-system 403 and the line error is localized by the double buffering of the interfaces.

However, if the worst case bandwidth is prolonged and new video line data transfer requests for the next line are continuously generated in the two constrained macroblock periods, there may exist a situation when the pre-processor command FIFO buffer 407 overflows and the system processor 402 is interrupted at 1006 via a hardware pin 415 to resend its video line data transfer request at a later point of time. Ideally, this situation should not happen given careful consideration of the FIFO buffer size and the detailed simulation of possible bus traffic conditions.

The operation of the memory transfer controller 401, including handling of both VPP_PANIC and ENC_PANIC situations is represented in the state diagram of FIG. 10. The occurrence of ENC_PANIC causes a transition from the MTC_ENC state 902 to a MTC_VPP state 903 to process the next sub-set of video line data transfers (if necessary) before the current set of macroblock data transfers. However, both operational states MTC_VPP 902 and MTC_ENC 903 transition to the MTC_RECOVER state 904 during VPP_PANIC, as it has the highest priority. On recovery, the memory transfer controller 401 transitions to MTC_VPP state 902 if there are outstanding video line data transfers, or else to MTC_ENC state 903 if there are outstanding macroblock data transfers, or else back to the reset MTC_IDLE state 901 if there are no data transfers to be performed.

An embodiment of the present invention advantageously provides a higher resolution of memory access bandwidth control at the macroblock level for video line data and video macroblock data memory read/write transfers. It advantageously enables operation of systems at a peak close to or equal to the average memory access bandwidth.

The operation of the video compression system 400 described above may alternatively be embodied in a video decompression system having corresponding video decoder and post-processing subsystems.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A memory transfer controller, comprising:
   a first bus request module configured to transfer video line data to or from a video pre-processor;
   a second bus request module configured to transfer macroblock data to or from a video encoder; and
   a processor configured to control data transfers by the first bus request module and the second bus request module,
   wherein a size of a unit of the video line data is larger than a size of a unit of the macroblock data and transfers of the macroblock data is effected in a first time period,
   wherein the memory transfer controller is adapted to divide the video line data into two or more portions for transfer of each of said portions in respective ones of said first time period, and
   wherein the memory transfer controller is configured to temporally align a transfer of at least some of said portions of the divided video line data and at least some of the macroblock data to a start of the first time period.

2. The memory transfer controller of claim 1 wherein if a transfer of one of said portions is not completed within a particular first time period then a transfer of said one portion is completed and a transfer of a subsequent one of said portions is effected in preference to a transfer of macroblock data for said particular first time period.

3. The memory transfer controller of claim 1 wherein if a transfer of one or more of said portions is not completed within a second time period, the memory transfer controller enters a recovery mode, wherein processing of other data transfers is suspended to allow completion of transfer of said one or more portions.

4. The memory transfer controller of claim 3 wherein the first time period is about 23 μs to 25 μs and the second time period is about 63 μs to 65 μs.

5. The memory transfer controller of claim 1 wherein if a transfer of one or more of said portions is not completed within a second time period, the memory transfer controller enters a recovery mode, wherein processing of other data transfers is suspended to allow completion of active transfers of said one or more portions and uninitiated transfers of said one or more portions are cancelled.

6. The memory transfer controller of claim 1 wherein the first time period is determined according to a macroblock processing rate and an estimated overhead processing and I/O rate.

7. The memory transfer controller of claim 1 wherein said temporally aligned transfer includes a burst transfer performed during the first time period.

8. The memory transfer controller of claim 1 wherein said video line data includes raster data.

9. The memory transfer controller of claim 1 wherein said temporally aligned transfer is performed between the first and second subsystems and a memory on a shared system bus.

10. The memory transfer controller of claim 1 wherein said memory transfer controller is adapted to:
   extend transfer of a current unit of macroblock data by one first time period and extend a current macroblock processing period in the second subsystem by said one first time period; and
   delay transfer of a next unit of macroblock data by said one first time period and delay a start of a next macroblock processing period in the second subsystem by said one first period,
   if the current unit of macroblock data is not completely transferred within a current first time period.

11. An apparatus, comprising:
   a first subsystem configured to perform video line processing;
   a second subsystem configured to perform macroblock processing; and
   a memory transfer controller configured to control a transfer of video line data, associated with the first subsystem and a transfer of macroblock data, associated with the second subsystem,
   wherein the transfer of the macroblock data is effected in a first time period,
   wherein the memory transfer controller is adapted to divide the video line data into two or more portions for transfer of each of said portions in respective ones of said first time period, and
   wherein the memory transfer controller is configured to temporally align a transfer of each of said portions of the divided video line data and of the macroblock data to a start of respective ones of said first time period.

12. The apparatus of claim 11 wherein a size of a unit of the video line data is larger than a size of a unit of the macroblock data.

13. The apparatus of claim 11 wherein said memory transfer controller is adapted to perform said temporally aligned transfer as a burst transfer during the first time period.

14. The apparatus of claim 11 wherein said video line data includes raster data.

15. The apparatus of claim 11 wherein said memory transfer controller is adapted to delay transfer of a next unit of macroblock data by one said first time period, if a current unit of macroblock data is not completely transferred within a current first time period.

16. A memory transfer controller apparatus, comprising:
   means for aligning temporally a burst transfer of a portion of video line data, associated with a first subsystem with video line processing, and a set of macroblock data, associated with a second subsystem with macroblock processing, to a macroblock period; and
   means for initiating the burst transfer, having the portion of video line data and the set of macroblock data integrated therein, at a start of the macroblock period, the burst transfer being performed between the first and second subsystems and a memory on a shared system bus.

17. The memory transfer controller apparatus of claim 16 wherein said video line data includes raster data.

18. The memory transfer controller apparatus of claim 16, further comprising means for delaying transfer of a next set of macroblock data by one said macroblock period, if a current set of macroblock data is not completely transferred within a current macroblock period.

* * * * *